(12) United States Patent
Graefe

(10) Patent No.: US 9,122,724 B2
(45) Date of Patent: Sep. 1, 2015

(54) COMBINED JOIN

(75) Inventor: Goetz Graefe, Madison, WI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1889 days.

(21) Appl. No.: 12/260,053

(22) Filed: Oct. 28, 2008

(65) Prior Publication Data

US 2010/0106711 A1    Apr. 29, 2010

(51) Int. Cl.
*G06F 17/30* (2006.01)

(52) U.S. Cl.
CPC .... *G06F 17/30498* (2013.01); *G06F 17/30336* (2013.01); *G06F 17/30474* (2013.01)

(58) Field of Classification Search
CPC ............... G06F 17/30498; G06F 17/30336; G06F 17/30474
See application file for complete search history.

(56) References Cited

U.S. PATENT DOCUMENTS

| 6,105,024 | A * | 8/2000 | Graefe et al. ........................ 1/1 |
| 2006/0167865 | A1* | 7/2006 | Andrei ............................... 707/4 |
| 2007/0027860 | A1 | 2/2007 | Bestgen et al. |
| 2007/0156734 | A1 | 7/2007 | Dipper et al. |
| 2007/0233439 | A1* | 10/2007 | Carroll et al. ..................... 703/6 |
| 2007/0276788 | A1 | 11/2007 | Cohen |
| 2009/0281985 | A1* | 11/2009 | Aggarwal .......................... 707/2 |
| 2010/0306212 | A1* | 12/2010 | Tsirogiannis et al. ......... 707/759 |

OTHER PUBLICATIONS

Shah, M.A. et al., "Fast Scans and Joins using Flash Drives," DaMoN 2008, Jun. 13, 2008.*
Graefe, G., "Write-Optimized B-Trees", Proceedings for 30th VLDB, Aug. 29-Sep. 3, 2004.*
Graefe, G., "Implementing Sorting in Database Systems", ACM Computing Survey, vol. 38, No. 3 Article 10, Sep. 2006.*
"Hash join," by Wikipedia (revision from Oct. 23, 2007). Available at: http://en.wikipedia.org/w/index.php?title=Hash_join&oldid=166457722.*
Bratbergsengen, Kjell, Hashing Methods and Relational Algebra Operations, , pp. 323-333, Singapore, Aug. 1984.
Dewitt, David J. et al., GAMMA—A High Performance Dataflow Database Machine, Proceedings of the Twelfth International Conference on Very Large Data Bases, pp. 228-238, Kyoto, Aug. 1986.
Graefe, Goetz, Query Evaluation Techniques for Large Databases, ACM Computing Surveys, vol. 25, No. 2, Jun. 1993.
Wikipedia, Quicksort, http://en.wikipedia.org/wiki/Quicksort, pp. 1-8, Oct. 28, 2008.
Dewitt, David J., et al., Nested Loops Revisited, IEEE, pp. 230-242, 1993.

(Continued)

*Primary Examiner* — Daniel Kinsaul
(74) *Attorney, Agent, or Firm* — Mannava & Kang, P.C.

(57) ABSTRACT

Computer-implemented systems and associated operating methods perform a combined join. A computer-implemented system comprises a processor that performs query processing in a relational database by receiving inputs of a variety of cases and sizes, and performing a combined database join of two of the received inputs using an index in memory formed from records of the first input and probed with records from the second input by optimizing the index for increased-speed searching using fast parent-to-child navigation. The variety of cases comprise combinations of unsorted, sorted, and indexed inputs, and the variety of sizes comprise input sizes from smaller than the available memory to input sizes substantially larger than available memory.

14 Claims, 16 Drawing Sheets

(56) References Cited

OTHER PUBLICATIONS

Dewitt, David J., et al., Implementation Techniques for Main Memory Database Systems, ACM, pp. 1-8, 1984.

Dewitt, David J., et al., Multiprocessor Hash-Based Join Algorithms, Computer Science Department, pp. 1-23, University of Wisconsin, Aug. 1985.

* cited by examiner

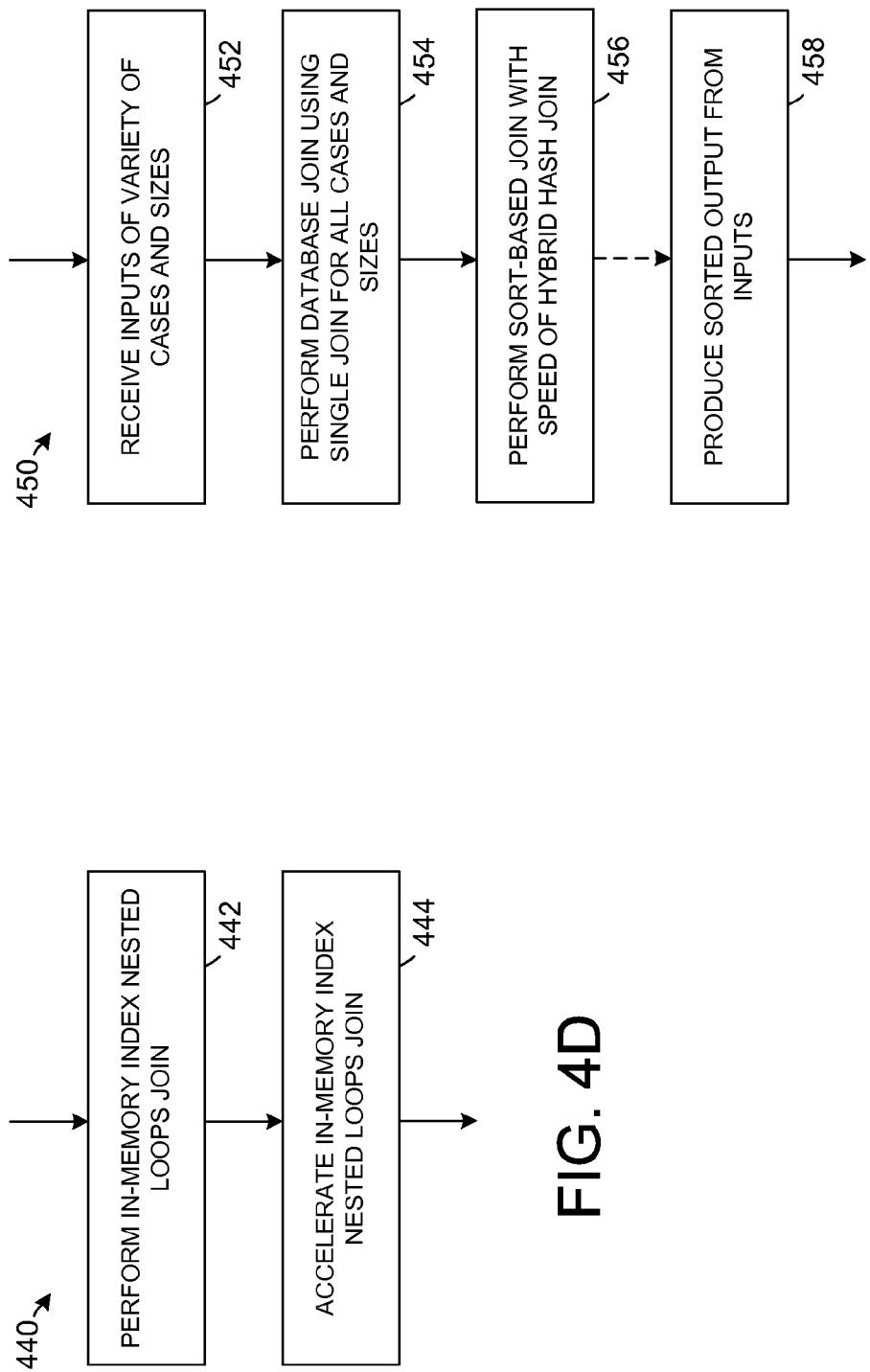

COMBINED JOIN

BACKGROUND

A join is a fundamental operation in relational algebra used to combine records from two tables in a relational database, resulting in a new and temporary table, sometimes called a joined table. The join can also be considered an operation that relates tables by values common to the tables.

Many join algorithms have been developed which have variable performance for different memory sizes and cases of indexed, sorted, and unsorted inputs. As a consequence of the variable performance for different cases and memory sizes, traditionally three alternative join algorithms are used to achieve the highest run-time performance in all cases, substantially covering the entire range of possible join situations.

SUMMARY

Embodiments of computer-implemented systems and associated operating methods perform a combined join. A computer-implemented system comprises a processor that performs query processing in a relational database by receiving inputs of a variety of cases and sizes, and performing a combined database join of two of the received inputs using an index in memory formed from records of the first input and probed with records from the second input by optimizing the index for increased-speed searching using fast parent-to-child navigation. The variety of cases comprise combinations of unsorted, sorted, and indexed inputs, and the variety of sizes comprise input sizes from smaller than the available memory to input sizes substantially larger than available memory.

BRIEF DESCRIPTION OF THE DRAWINGS

Embodiments of the invention relating to both structure and method of operation may best be understood by referring to the following description and accompanying drawings:

FIGS. 4A through 4E are flow charts showing one or more embodiments or aspects of a computer-executed method for performing a combined join;

DETAILED DESCRIPTION

Embodiments of systems and methods are disclosed which perform a combined join algorithm.

The combined join algorithm exploits characteristics of sorted inputs while performing substantially as well on unsorted inputs as existing join algorithms. Accordingly, the combined join is suitable for any data characteristics or cases, including indexed, sorted, and unsorted inputs of all sizes. The combined join is also suitable for the full range of memory sizes in which the algorithm is implemented. The combined join is intended for usage with all data cases and data sizes and is not simply a run-time choice that is selected based on particular data characteristics.

The combined join combines aspects of the three traditional join algorithms and at least matches the performance of the best in all situations.

Figure 1:
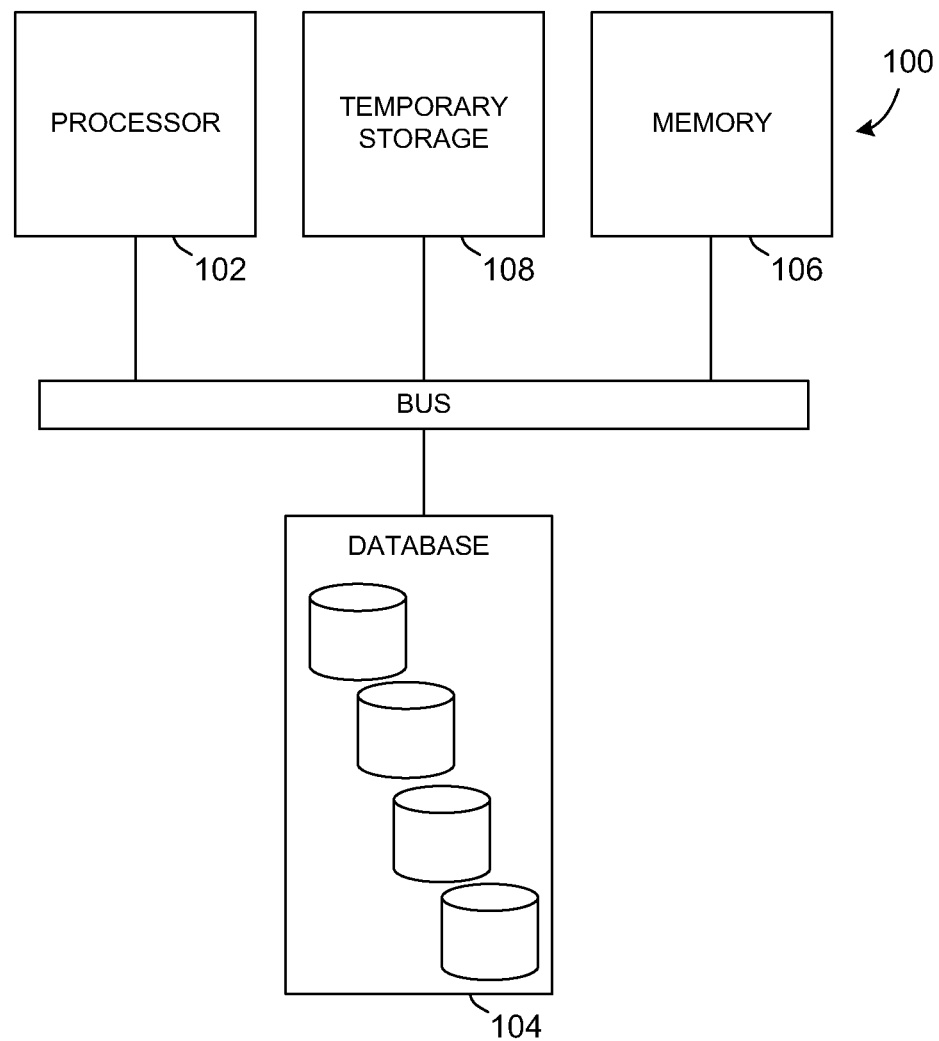
FIG. 1 is a schematic block diagram showing an embodiment of a computer-implemented system configured for performing a combined join.

Referring to FIG. 1, a schematic block diagram illustrates an embodiment of a computer-implemented system 100 configured for performing a combined join. The illustrative computer-implemented system 100 comprises a processor 102 that performs query processing in a relational database 104 by receiving inputs of a variety of cases and sizes, and performing a combined database join of two of the received inputs using an index in memory formed from records of the first input and probed with records from the second input by optimizing the index for increased-speed searching using fast parent-to-child navigation. The variety of cases comprise combinations of unsorted, sorted, and indexed inputs, and the variety of sizes comprise input sizes from smaller than the available memory to input sizes substantially larger than available memory.

In an example embodiment, the processor 102 can perform fast-parent-to-child navigation which improves over traditional join methods by pinning pages in a buffer pool, and adding off-page child pointers to parent pages using memory addresses of buffer descriptors of the child pages.

In a particular implementation, the processor 102 can perform a combined join for unsorted large inputs in three phases. In a first phase, the first input and the second input that is at least as large as the first input are consumed. Sorted run files are written to temporary storage 108 for both the first and second inputs.

In a second phase, run files of the first input are merged to completion into a single run, and run files of the second input are partially merged input into runs the size of the first input.

In a third phase, a key range is selected such that memory 106 can hold all records from the first input with key values in the selected key range. The key domain is divided into ranges wherein each range from the first input and an in-memory index for the index nested loops join fit into memory 106. An in-memory index is built for records from the first input. All records from the second input with key values in the key range are joined with the indexed records from the first input. Operations of the third phase are repeated until all join processing for all key ranges is complete.

In various implementations, the processor 102 can perform an in-memory index nested loops join operation and accelerate the in-memory index nested loops join to operate as fast as an in-memory hash join using a suitable technique. Examples of suitable techniques include pre-loading, large pages, key normalization, prefix truncation, dynamic prefix truncation, order-preserving compression, poor man's normalized key, interpolation search, pinning, administration that avoids replacement, in-memory pointers, resumed descent, and the like.

In various configurations and/or conditions, the processor 102 can perform a combined join that implements any join variant such as inner join, left/right/full outer join, (anti-) semi-join, set operations intersection/union/difference/symmetric difference, and the like.

The computer-implemented system 100 can be formed in any suitable context. For example, the processor 102 can perform a combined join in one or more contexts of demand-driven dataflow, data-driven dataflow in a computer selected from a group consisting of uni-processors, many-core processors, shared-memory computers, distributed-memory computers, massively-parallel computers, and others.

Similarly, the processor 102 can perform a combined join in one or more levels of a memory hierarchy, such as central processing unit (CPU) cache, random access memory (RAM), flash storage, storage disks, or any other storage.

Figure 2:
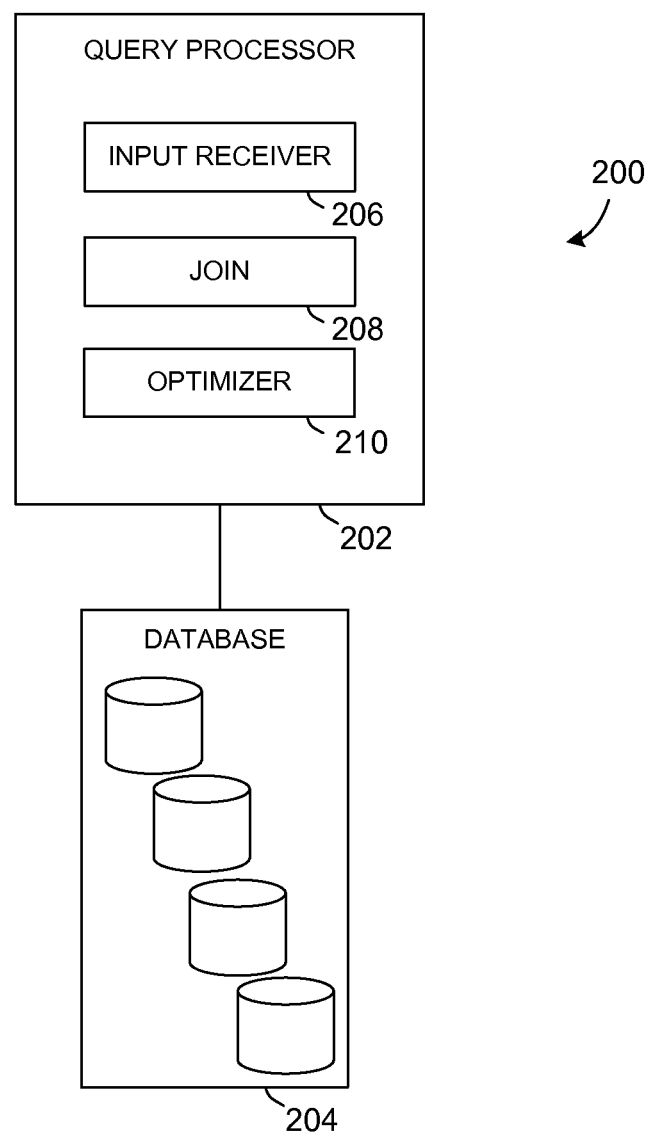
FIG. 2 is a schematic block diagram depicting another embodiment of a computer-implemented system configured for performing a combined join.

Referring to FIG. 2, a schematic block diagram illustrates an embodiment of a computer-implemented system 200 configured for performing a combined join. The computer-implemented system 200 comprises means 202 for performing query processing in a relational database 204. The query processing means 202 comprises means 206 for receiving inputs of a variety of cases and sizes. The variety of cases includes combinations of unsorted, sorted, and indexed inputs. The variety of sizes includes input sizes ranging from smaller than the available memory to input sizes substantially larger than available memory. The query processing means 202 further comprises means 208 for performing a combined join of inputs using an index in memory formed from records of the first input and probed with records from the second input, and means 210 for optimizing the index for increased-speed searching by fast parent-to-child navigation. The optimizing means 210 pins pages in a buffer pool and adds off-page child pointers to parent pages using memory addresses of buffer descriptors of the child pages.

Figure 3:
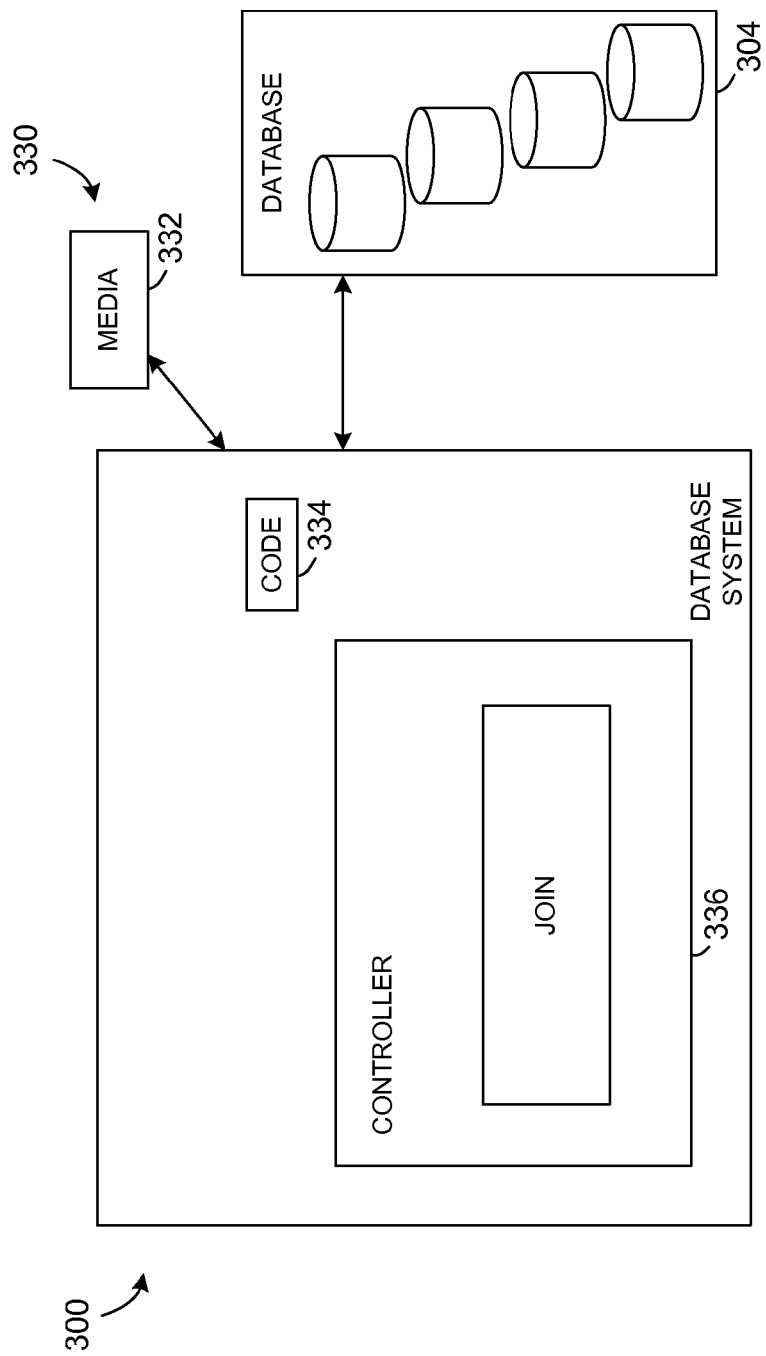
FIG. 3 is a schematic block diagram illustrating an embodiment of a computer-implemented system in the form of an article of manufacture that can also perform a combined join.

Referring to FIG. 3, a schematic block diagram illustrates an embodiment of a computer-implemented system 300 in the form of an article of manufacture 330 that can also perform a combined join. The article of manufacture 330 comprises a controller-usable medium 332 having a computer readable program code 334 embodied in a controller 336 for performing query processing in a relational database 304. The computer readable program code 334 comprises code causing the controller 336 to receive inputs of the variety of cases and sizes, and code causing the controller 336 to perform a combined join of two of the received inputs using an index in memory formed from records of the first input and probed with records from the second input. The computer readable program code 334 further comprises code causing the controller 336 to optimize the index for increased-speed searching by fast parent-to-child navigation by pinning pages in a buffer pool and adding off-page child pointers to parent pages using memory addresses of buffer descriptors of the child pages.

Figures 4A, 4B:
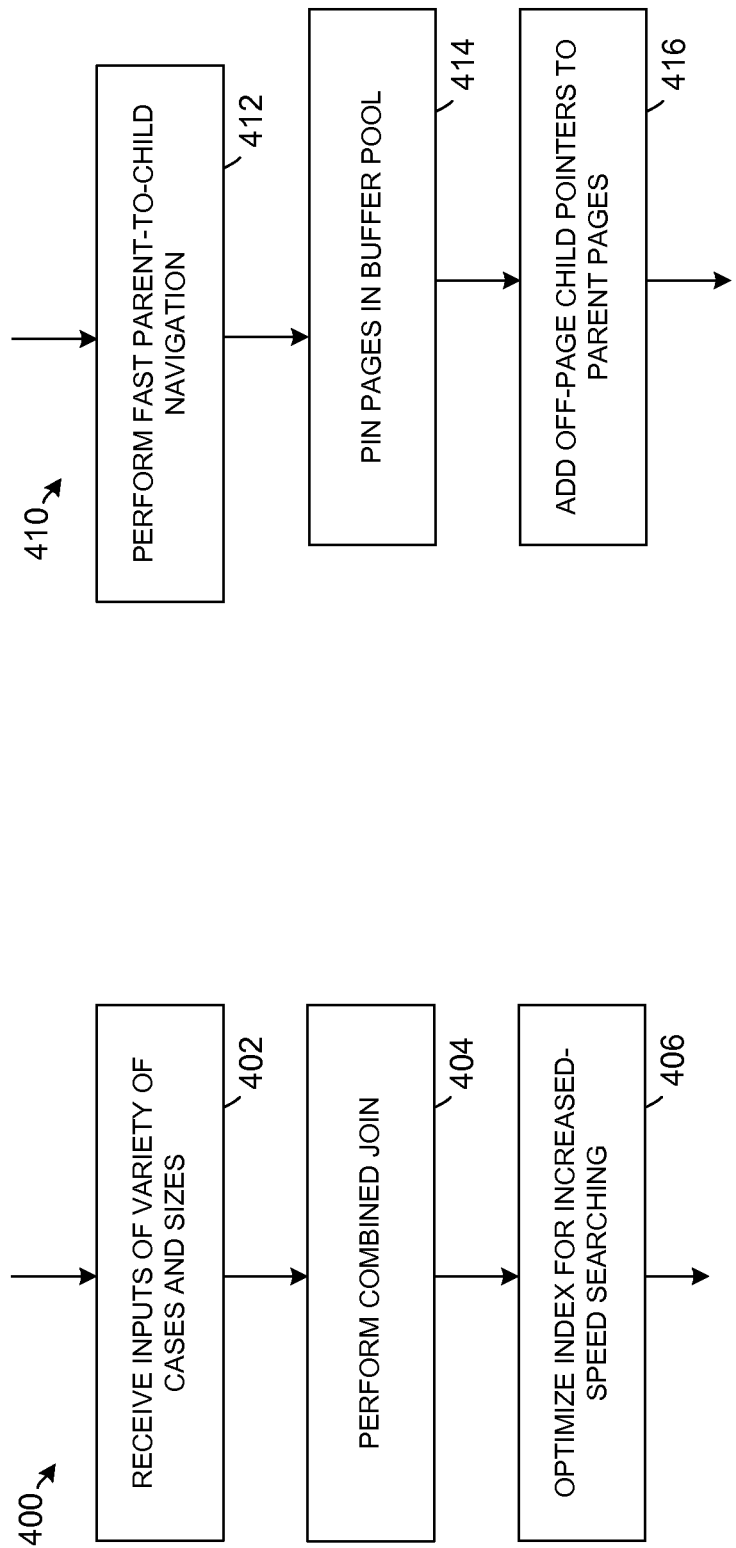

Referring to FIGS. 4A through 4E, flow charts illustrate one or more embodiments or aspects of a computer-executed method for performing a combined join. FIG. 4A depicts a computer-executed method 400 for query processing in a relational database comprising receiving 402 inputs of a variety of cases and sizes. The variety of cases includes combinations of unsorted, sorted, and indexed inputs. The variety of sizes includes input sizes from smaller than the available memory to input sizes substantially larger than available memory. The method 400 further comprises performing 404 a combined join of inputs using an index in memory formed from records of the first input and probed with records from the second input, and optimizing 406 the index for increased-speed searching by fast parent-to-child navigation.

Referring to FIG. 4B, an embodiment of the computer-executed method 410 wherein fast parent-to-child navigation 412 can further comprise pinning 414 pages in a buffer pool, and adding 416 off-page child pointers to parent pages using memory addresses of buffer descriptors of the child pages.

Figure 4C:
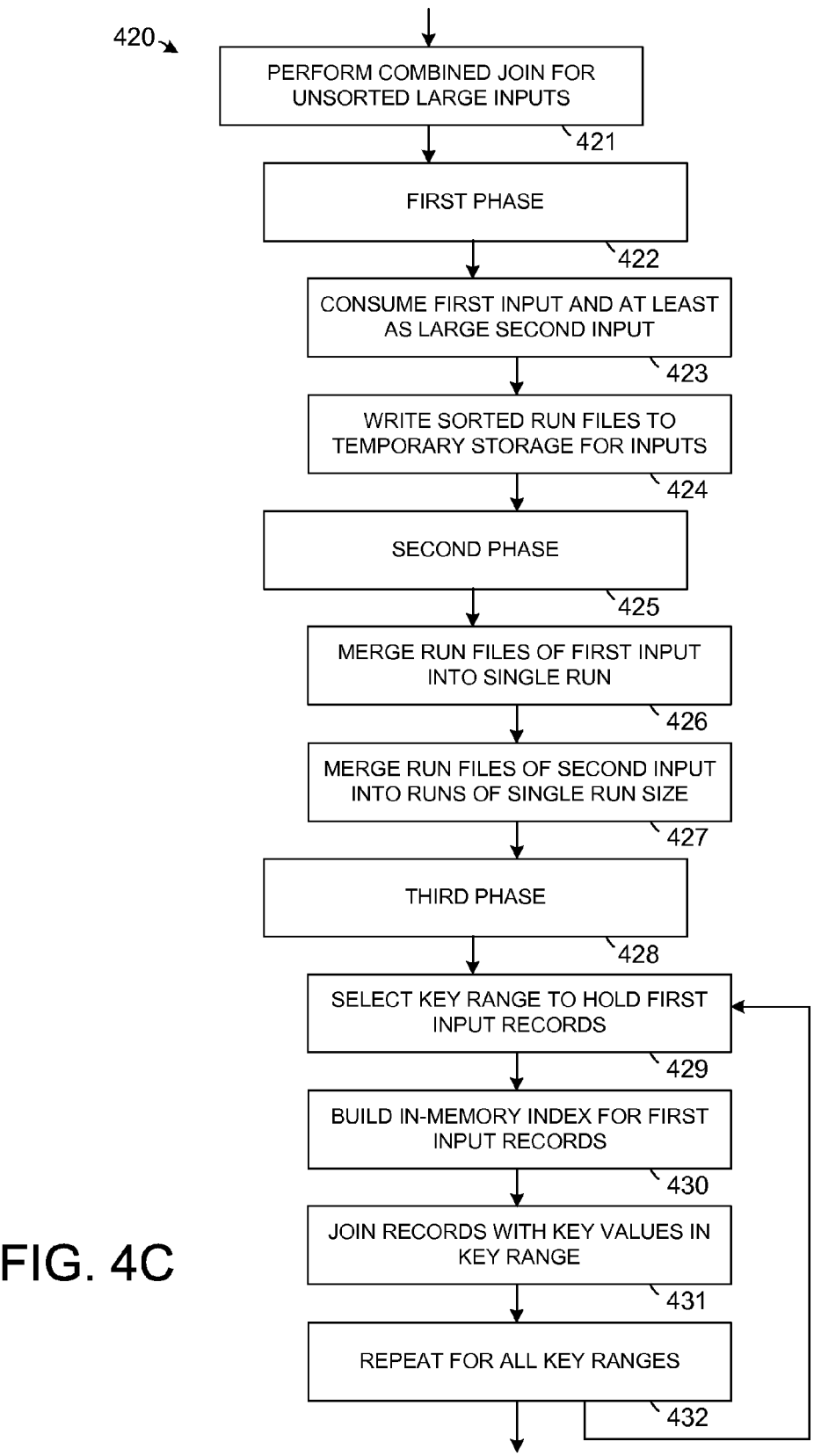

Referring to FIG. 4C, a particular example implementation computer-executed method 420 for query processing in a relational database can comprise performing 421 a combined join for unsorted large inputs in three phases. In a first phase 422, the method can comprise consuming 423 the first input and the second input that is at least as large as the first input, and writing 424 sorted run files to temporary storage for both the first and second inputs. In a second phase 425, the method can comprise merging 426 run files of the first input into a single run, and merging 427 run files of the second input into run files of approximately equal size to the entire first input. In a third phase 428, the method can comprise selecting 429 a key range wherein memory can hold all records from the first input with key values in the selected key range, building 430 an in-memory index for records from the first input, and joining 431 all records from the input with key values in the key range with the indexed records from the first input. Actions of the third phase are repeated 432 until all join processing for all key ranges is complete.

In a more specific example, the second phase can comprise merging the runs from the first input to completion, and incompletely merging the runs from the second input into runs approximately equal to the size of the first run.

In the third phase, a key domain can be divided into ranges wherein each range from the first input and an in-memory index for the index nested loops join fit into memory.

Referring to FIG. 4D, a computer-executed method 440 for query processing in a relational database can comprise performing 442 an in-memory index nested loops join operation, and accelerating 444 the in-memory index nested loops join to operate as fast as an in-memory hash join. The join can be accelerated 444 using any suitable technique of multiple techniques. Examples of suitable techniques can include pre-loading, large pages, key normalization, prefix truncation, dynamic prefix truncation, order-preserving compression, poor man's normalized key, interpolation search, pinning, administration that avoids replacement, in-memory pointers, resumed descent, and others.

Referring to FIG. 4E, a computer-executed method 450 for query processing in a relational database can comprise receiving 452 inputs of a variety of cases and sizes and performing 454 a combined join of inputs using an index in memory formed from records of the first input and probed with records from the second input. The method 450 further comprises performing 456 a sort-based join that operates with efficiency and resource usage at least approximately equal to a hybrid hash join for unsorted inputs and adapts operating parameters to exploit characteristics of both sorted and indexed inputs. The operating parameters can include amount of data sorted, memory partitioning, technique for addressing unknown input size, and the like.

When consuming unsorted inputs, the combined join and hybrid hash join incur the same computation cost when permitted to use the same amount of memory. The combined join can produce nearly sorted output 458 whereas hybrid hash join produces entirely unsorted output.

The illustrative combined join can be used to implement any suitable join variant including inner joins, left/right/full outer joins, (anti-) semi-joins, and set operations such as intersection/union/difference/symmetric difference.

The index nested loops join can be used in various contexts, for example depending on particular application and/or conditions. The various contexts for usage of the index nested loops join can include demand-driven dataflow, data-driven dataflow in a computer selected from a group consisting of uni-processors, many-core processors, shared-memory computers, distributed-memory computers, massively-parallel computers, and others.

Similarly, the index nested loops join can be used in various levels of memory hierarchy including central processing unit (CPU) cache, random access memory (RAM), flash storage, storage disks, and the like.

Figure 5A:
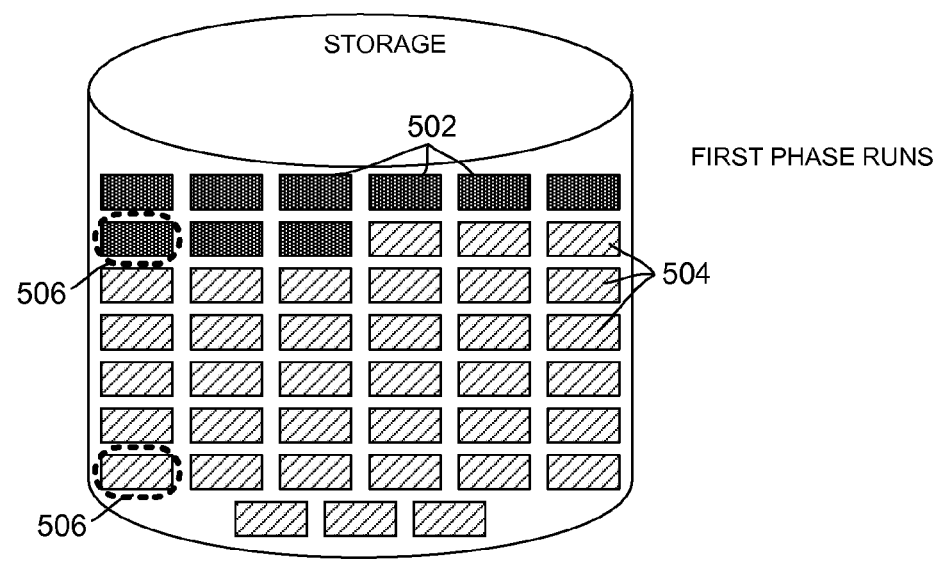
FIGS. 5A, 5B, and 5C are a sequence of pictorial diagrams illustrating operations of a three-phase combined join embodiment.
Figure 5B:
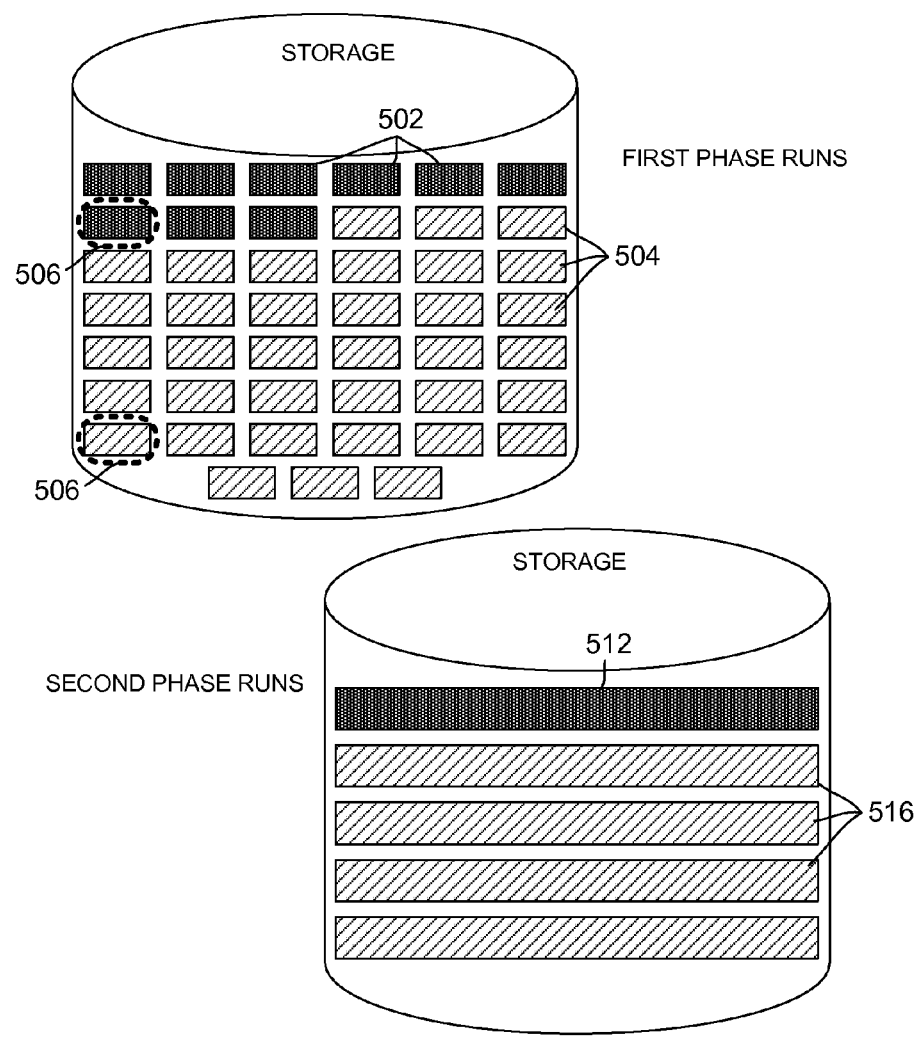
Figure 5C:
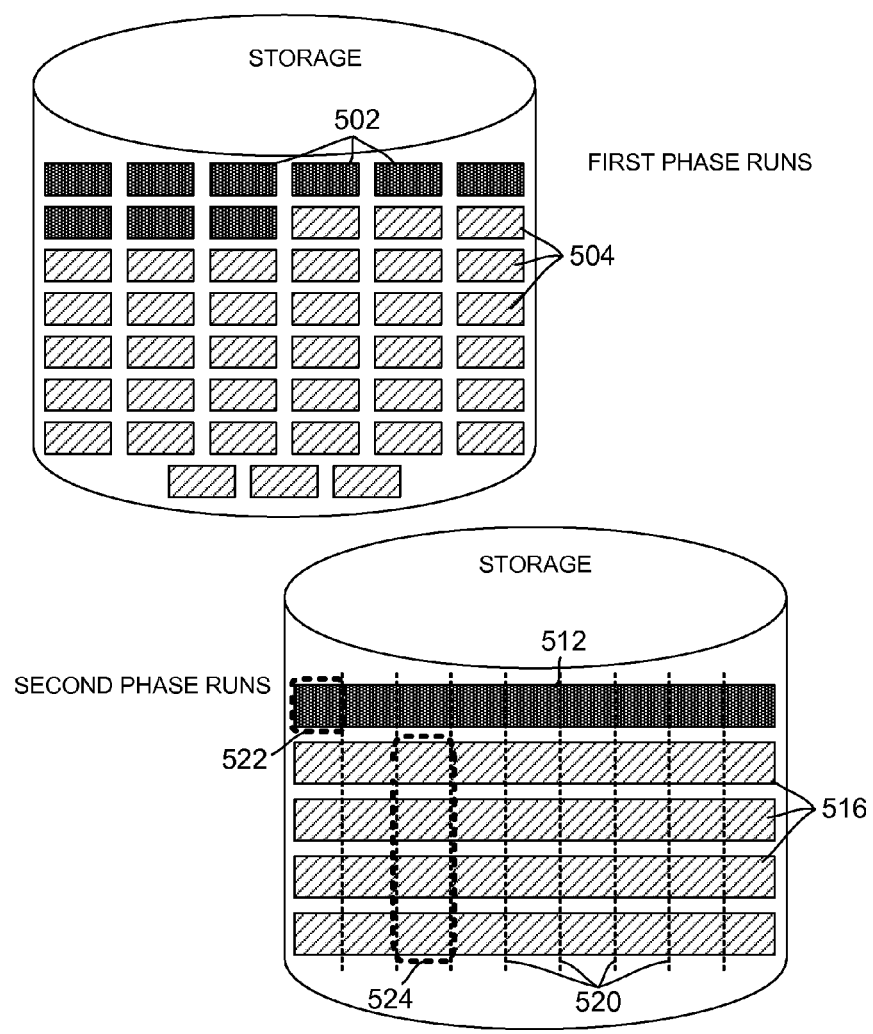

Referring to FIGS. 5A, 5B, and 5C, a sequence of pictorial diagrams illustrate operations of a three-phase combined join embodiment. If the inputs are sorted, the join omits the first and second phases and can immediately begin the third phase. The three-phase combined join uses memory for different purposes in the different phases. The memory is used for run generation in the first phase, merging in the second phase, and joining in the third phase. FIG. 5A shows operation in a first phase wherein the inputs are unsorted and unindexed, and thus contain no characteristics that can be exploited to improve performance. The inputs are simply scanned and consumed in a first phase run generation which includes $N_1/M+N_2/M$ runs of size M, where $N_1$ is the size of the first and smaller input, $N_2$ is the size of the second and larger input, and M is the memory size with all sizes expressed in pages, and F is merge fan-in, a scalar without unit. First phase operations are similar to what is performed for merge sorts in consuming first and second inputs. The first input is consumed to produce multiple runs 502, each of which is approximately the size of memory M 504. The second input is consumed which produces runs 506, which are also the size of memory. In an illustrative implementation, all the runs are built from all of the inputs as opposed to performing run generation and merging runs of the first input, then performing run generation and run merging the second input. Instead, all run generation should be performed initially.

The first phase is similar to a merge sort in which both the first and second inputs are sorted. Initially the sort fundamentally loads memory and performs a Quicksort equivalent in memory. (Quicksort is a well-know sort algorithm developed by C. A. R. Hoare.) Thus the first phase of the combined join is similar to a traditional sort-merge join in terms of algorithm, execution, cost, and the like, with some differences in timing.

As shown in FIG. 5B, during the second phase merging is begun. In the combined join technique, the extent of merging is limited to match the efficiency and performance of a hash join. The amount of merging for the combined join can be less than what is performed in a traditional merge join. The smaller of the first and second inputs, which in the illustrative example is the first input, is merged into one large run 512, forming one sorted first input. Then the second input, which is the larger input, is merged only as much as is suitable to make runs 516, each of which is as large as the run 512 of the first input. By merging the second larger input into runs 516 which are similar in size to the runs 512 of the first input, a cost behavior is achieved that is essentially equivalent to that of a hash join. Thus, in the second phase the first input is merged to form one first input run 512, and the second input is merged to form multiple runs from the second input 516, each of which is as large as the run from the first input 512. At the end of the second phase, the first input is fully sorted and the second input is almost completely sorted into runs of the same size as the first input. In the second phase, data is merged into $\log_F(N_1/M)$ merge levels. The cost per level is $2(N_1+N_2)$ for $1+N_1/N_2$ runs of size $N_1$.

The second phase includes two sort operations, one corresponding to the first input and another corresponding to the second input. The first merge-sort on the smaller, first input is run to completion. The second merge-sort on the larger, second input is halted prior to completion, attaining an increase in efficiency and savings in cost compared to a traditional merge-sort which runs to completion. The small input is merged to completion and the large input is not merged to completion, but is only merged into runs as large as the small input so the runs are suitable size to exist on disk. The cost-savings is approximately equivalent to the cost advantage a hash join has over a merge join. The hash join, in the case of two unequal input sizes, outperforms a merge-join.

Referring to FIG. 5C, during the third phase the join operation is performed by key range. For optimal performance, the key range is selected so that the first input segment for each key range fits in memory. Key range boundaries 520 are depicted. The third phase joins $N_1/M$ key range partitions of size M 522 corresponding to the first inputs, and approximate size $(N_2/N_1) \times M$ 524 corresponding to the second inputs.

The third phase performs the final join processing in which the records meet and produce the join output. In the depicted operation of the third phase, the run 512 from the first input is joined with the four runs 516 from the second input. The first input run 512 is sorted and each of the runs from the second input 516 is sorted. A key is selected that permits the records to fit in memory. Specifically, all records with a key value less than the selected key range fit in memory.

In operation, the first key range of the first input sorted file is loaded into memory. An in-memory index is built, and the runs from the second input are processed so the same key range is consumed from the run from the first input and each of the runs from the second input, thereby enabling the join to be performed in memory without the additional cost of off-loading to disk. The key range boundaries are defined such that the size of each of the first input segments fits into memory.

The combined join in some ways is similar to a sort merge join but supplemented by several innovative aspects. One aspect is the sort of the large input is stopped short to attain the same execution cost as the partitioning effort in a hash join algorithm.

Aspects of the combined join that facilitate improvements in performance and management of costs include (1) stopping short the sort of the larger of two input, and (2) dividing the entire key domain into ranges such that the smaller, first input record from one range fits into memory enabling building of an in-memory index with all the first input records in a certain range. Records from the second, larger input of the specified key range are then scanned in each of the second input files, enabling computation of the join output.

Accordingly, the combined join is competitive with a hash join, which outperforms the traditional merge join if the two inputs have different size.

Referring to FIGS. 6A through 6G, a sequence of pictorial diagrams shows operation of an embodiment of a combined join. The combined join described with respect to FIGS. 6A through 6G does not have strictly separate phases and thus differs from the three-phase combined join which corresponds to FIGS. 5A through 5C. The combined join concurrently uses memory for run generation and joining, resulting in efficient usage of memory and computation resources.

Figure 6A:
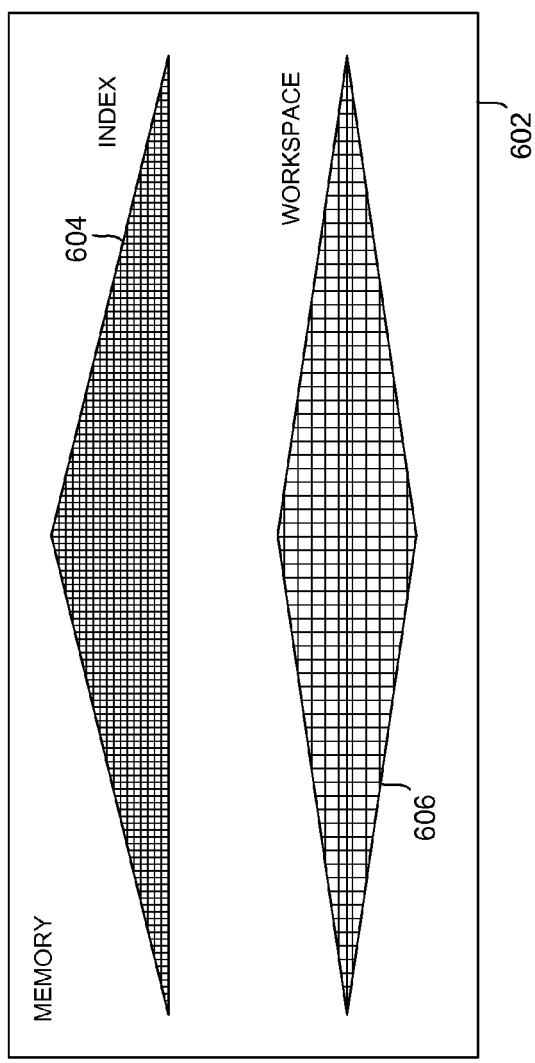
FIGS. 6A through 6G, a sequence of pictorial diagrams shows operation of an embodiment of a combined join.

As shown in FIG. 6A, operation of the index nested loops join begins with empty memory 602 which is divided in preparation for consumption of the inputs. For consumption of a first input, some of the memory 602 is allocated for usage as an in-memory index 604, enabling eventual search of the data structure very quickly. Some of the memory 602 is allocated for work space 606 for sorting, specifically for run generation.

Figure 6B:
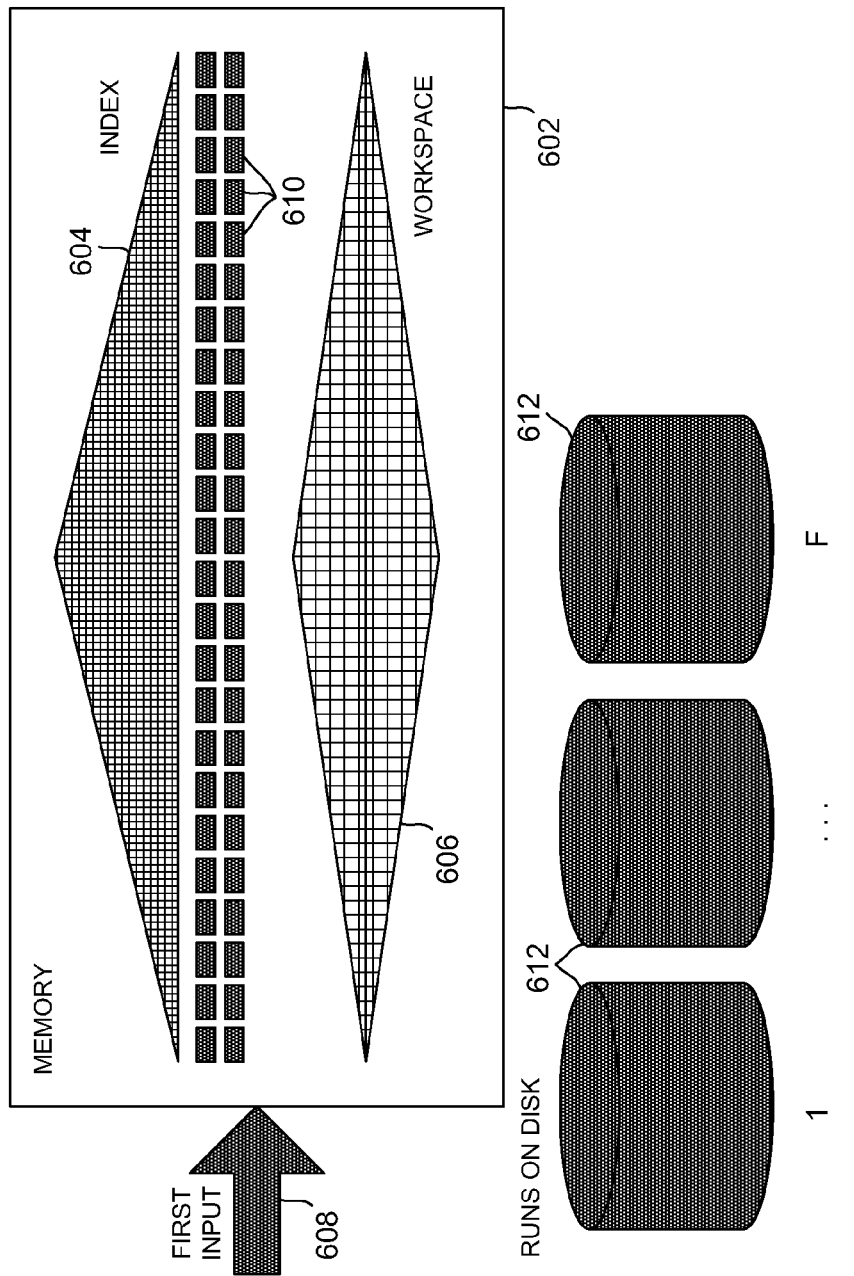

In FIG. 6B, the first input 608 is consumed and records 610 from a predetermined key range are inserted into the in-memory index 604 and records from the remaining key range are processed in the in-memory sort workspace 606, producing several runs on disk 612, for example marked 1 through F as shown. The size of the runs from the first input depends on the size of the workspace 606. Thus, the unified join can use workspace size as a control for determining how to divide memory. The goal is to create exactly F runs, and the size of the workspace is set to support the F runs. The memory 602 can thus be divided exactly the same way as for the hybrid hash join which uses an in-memory index and some amount of memory for output buffers. The amount of output buffers for the hash join thus approximates the amount of workspace 606 for the sort in the join. After consuming the first input 608, the in-memory index 604 and an empty sort workspace 606 are allocated because all data that falls into the defined key range are sorted into the F runs, each of the F runs has records from the entire key domain, but each of the F runs is sorted.

Figure 6C:
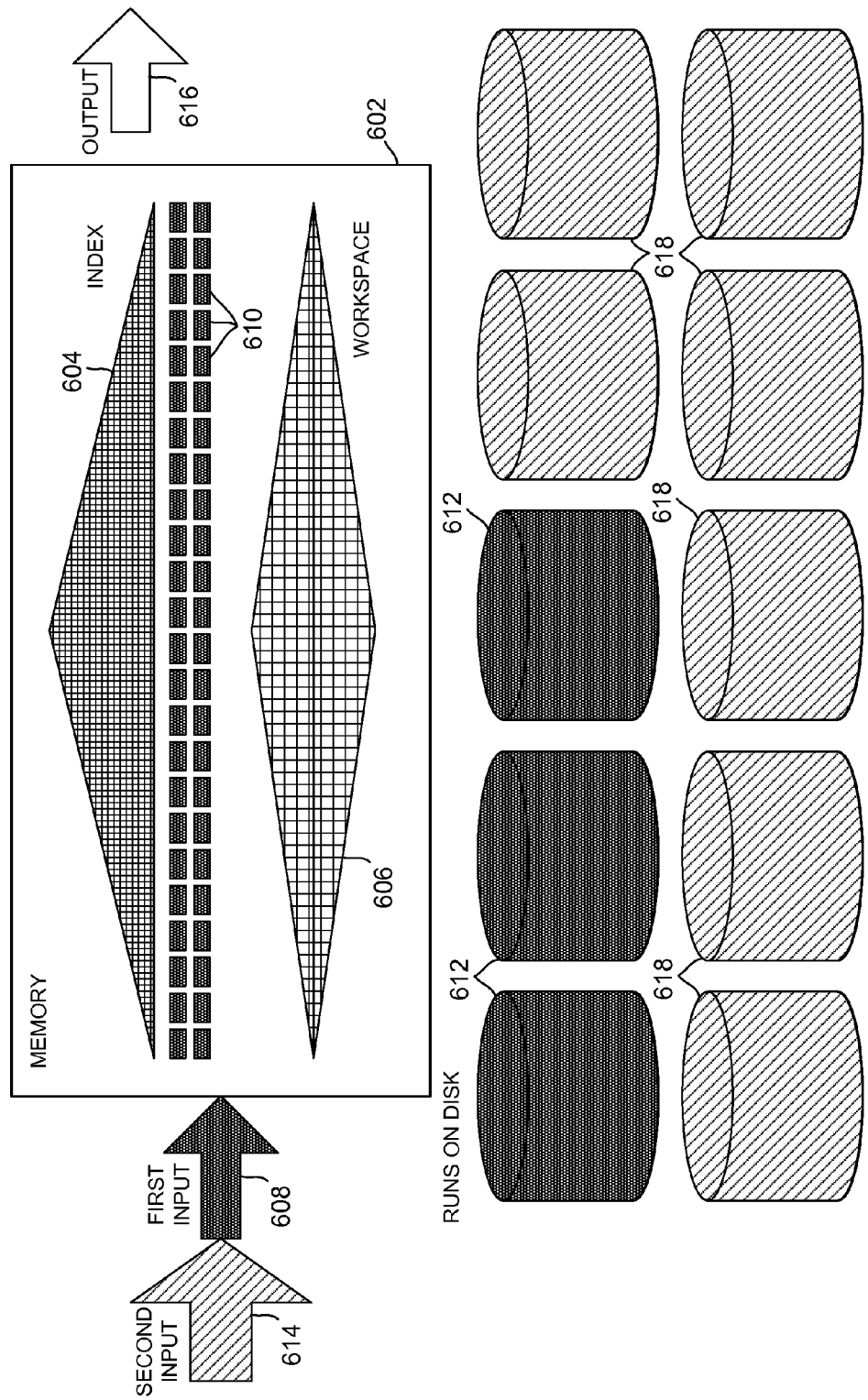

In FIG. 6C, the second input 614 is consumed, producing output 616. The output 616 represents records that belong to the key range in the in-memory index 604. Some amount of the second input 614 is immediately used so that some records in the second input 614 immediately are searched in the in-memory index 604 for matches that are produced as output 616. Simultaneously, some memory 602, for example the same amount of memory as used during the first phase, can be used as a sort workspace 606 again to produce the runs from the second input on disk 618. Thus, for a first input 608 that produces F runs from the first input, then the number of runs from the second input is $(N_2/N_1) \times M$ where $N_2/N_1$ is the relative size of the inputs. In the illustrative example, both the first 608 and second 614 inputs are consumed, an output 616 is produced, and three runs from the first input and seven runs from the second input are on disk.

Figure 6D:
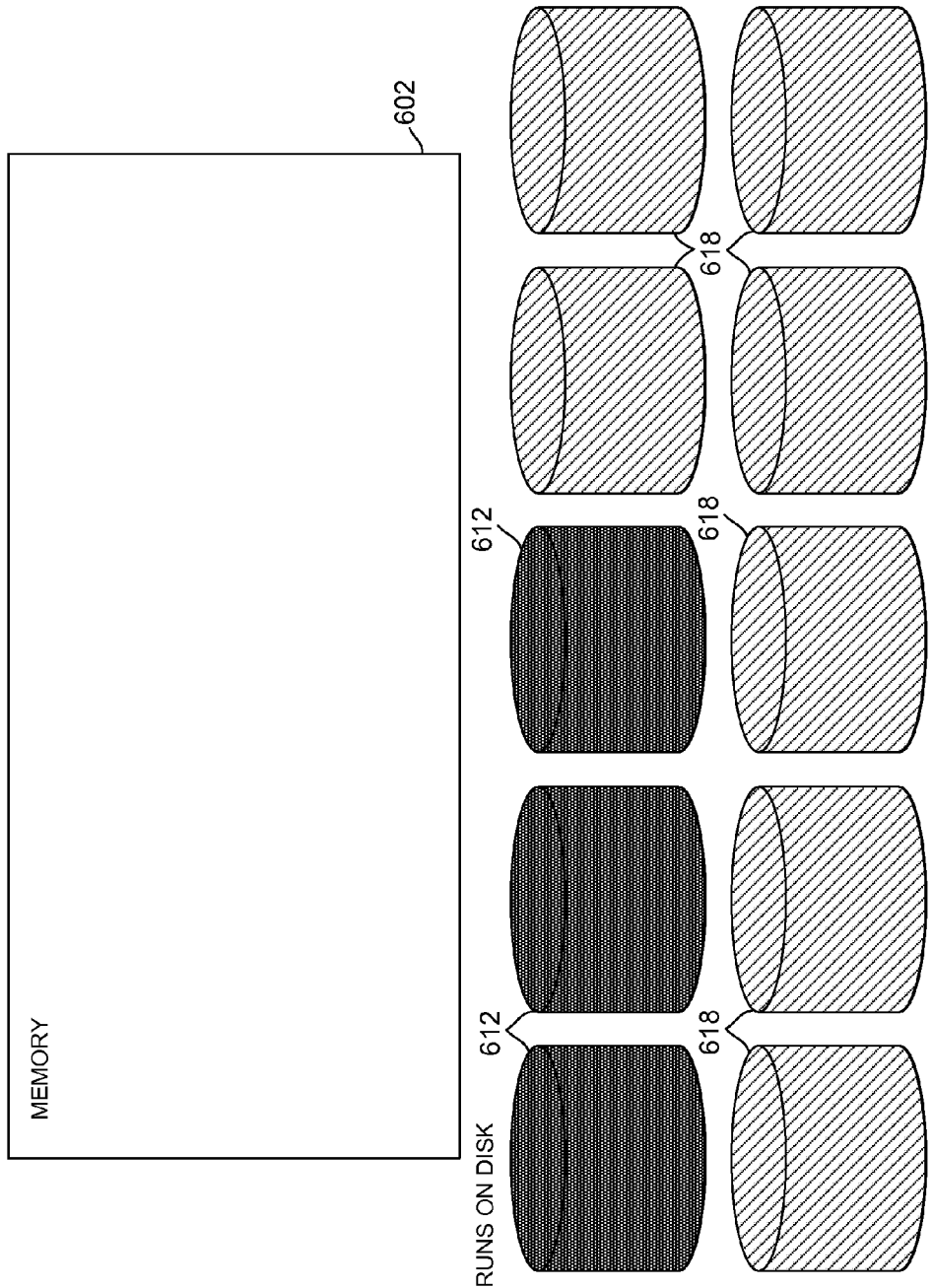

As shown in FIG. 6D, whatever is in memory 602 is no longer of use and can be discarded and the runs from the first input 612 and runs from the second input 618 are processed, which can be performed using the operations detailed in FIGS. 5A, 5B, and 5C.

Figure 6E:
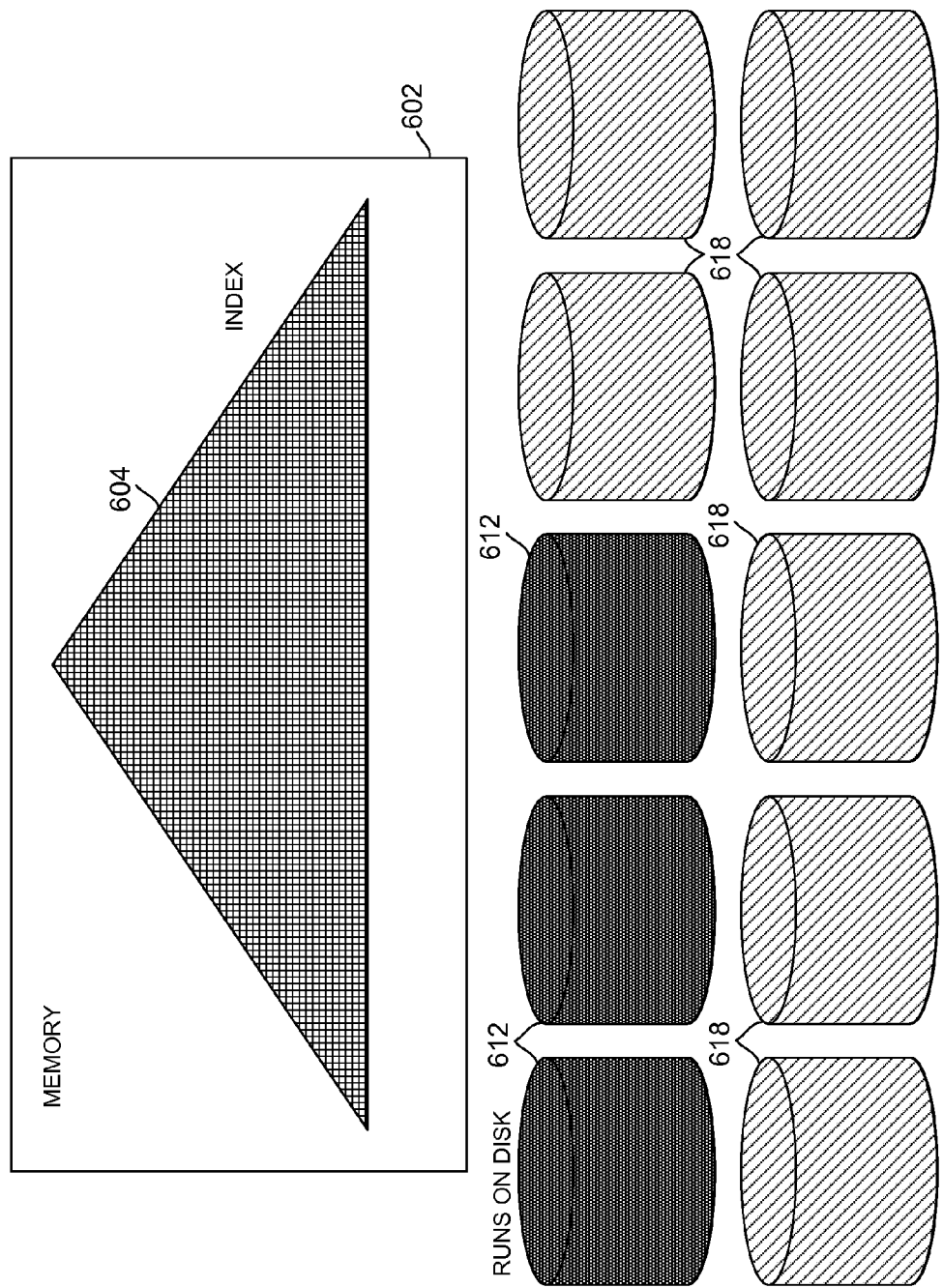
Figure 6F:
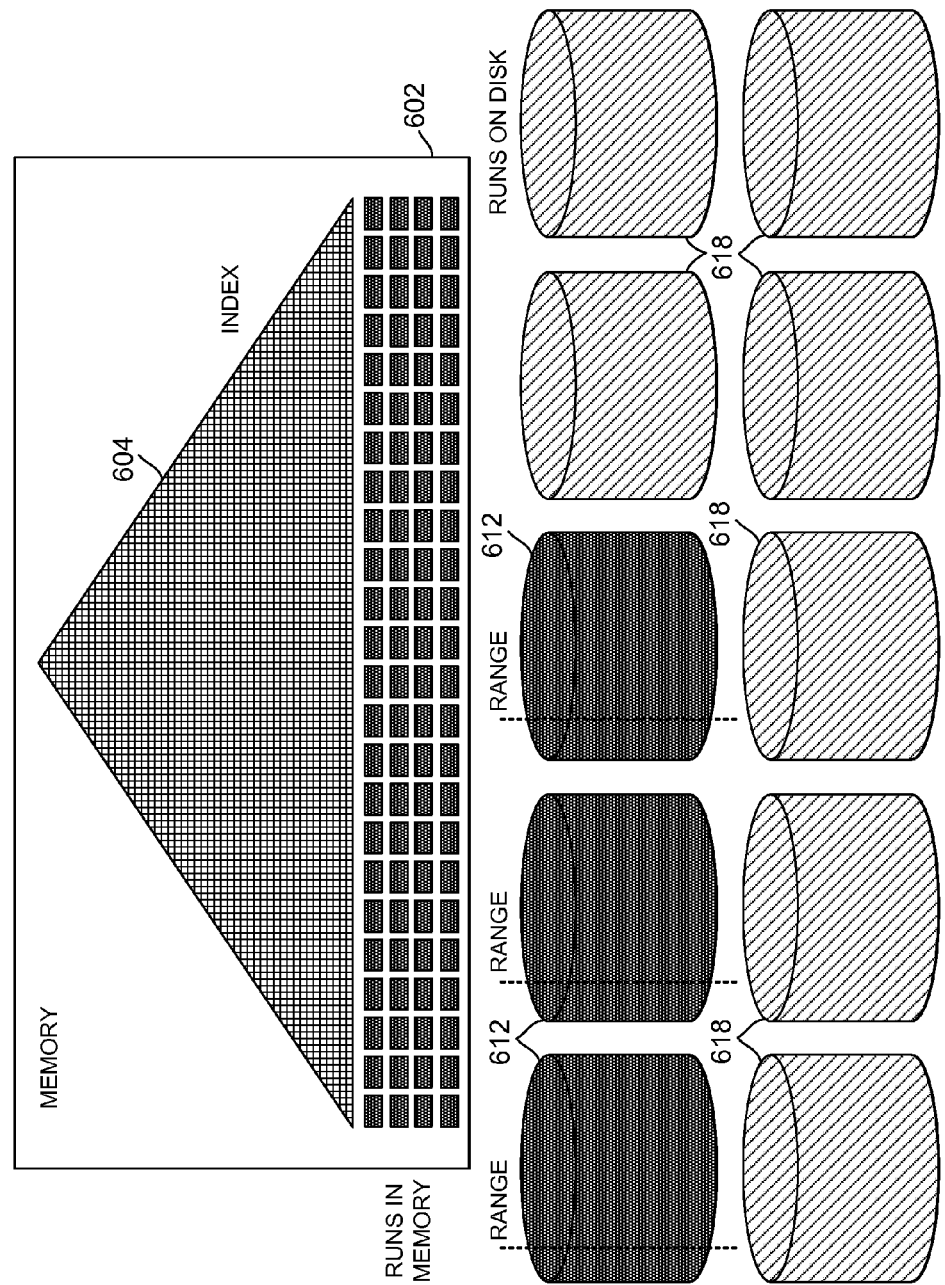

FIG. 6E shows the runs from the first input 612 and runs from the second input 618 on disk and the in-memory index 604. The entire key domain which is represented in the runs on disk is divided into ranges and, as shown in FIG. 6F, a range from the first input is consumed, loaded into memory, and an in-memory index 604 is produced for that key range. A portion, for example depicted as the left-most part and representing the smallest piece from each of the runs from the first input, is placed as an index in memory 602. The key allocated as a cutoff is the same key in each of the runs from the first input. The scan in the three runs from the first input can be advanced concurrently to determine which key fills the memory. The records consumed from the three runs from the first input, shown as the left-most part of the runs, is used to build the in-memory index.

Figure 6G:
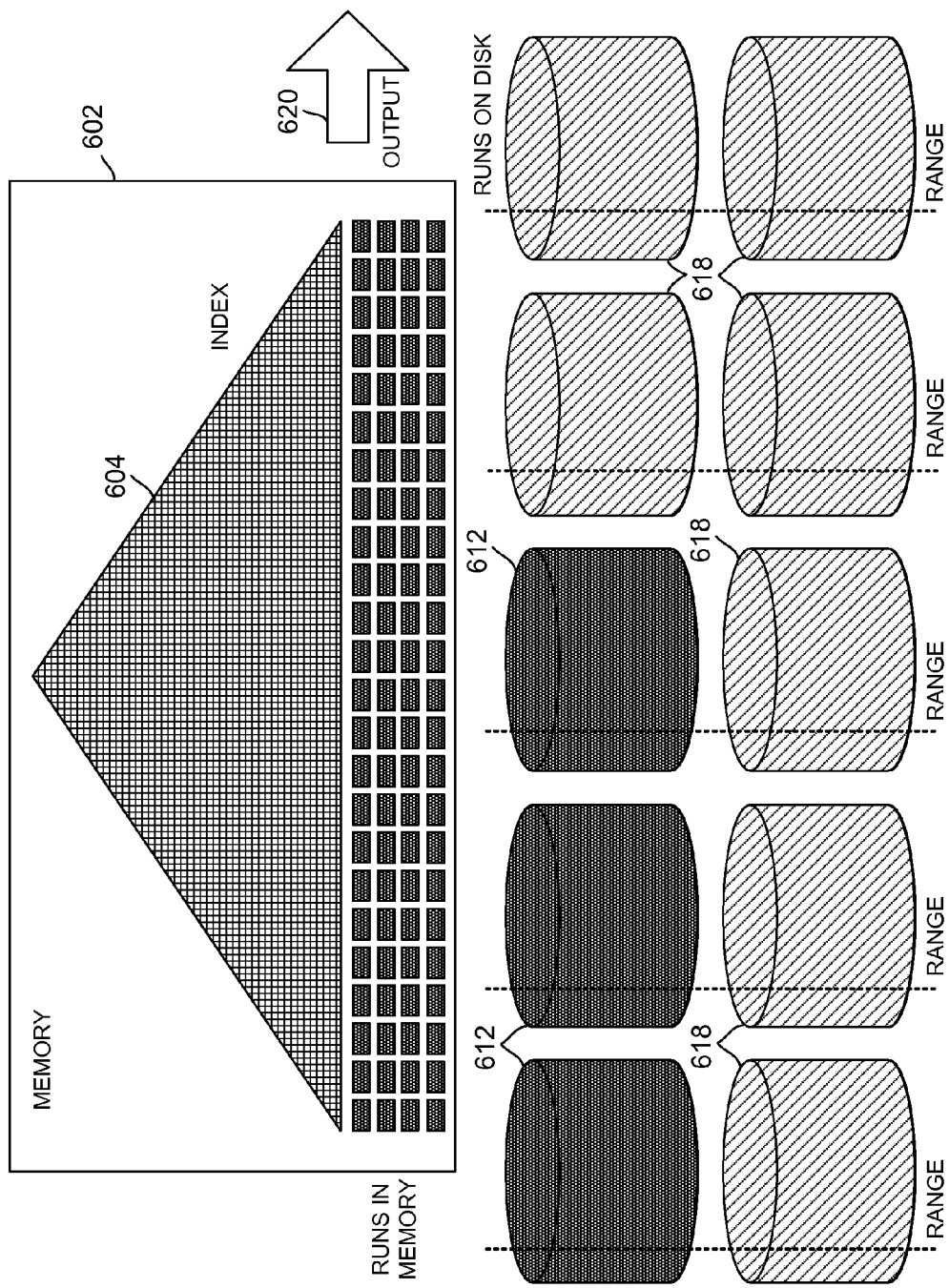

Once the in-memory index is built, as depicted in FIG. 6G, the same key range in each of the runs from the second input is scanned and immediately compared to runs from the first input by searching the in-memory index for matching records from the first input. As depicted, the left-most part of each of the runs from the second input is scanned to produce an output 620. Once the runs from the second input are scanned and output 620 produced, the memory can again be emptied to process a second key range from the three runs from the first input, build an in-memory index, take a second key range from the runs from the second input, produce output, and continuously repeat for key range after key range until the entire join is processed.

Accordingly, the combined join can operate to take into consideration the known memory size and the known size of the inputs to determine the amount of memory to dedicate, the number of partitions to create, the amount of memory to dedicate to output buffers for the partitions, and the amount of memory to retain for in-memory hash tables to perform immediate join processing. The combined join further takes into consideration the cost of performing a hash join to determine a suitable memory allocation into output buffers and in-memory hash table to approximate the cost of the hash join in amount of input/output traffic and processing burden.

The illustrative combined join is a novel join algorithm that produces sorted output. The combined join is as efficient as a hash join for large unsorted inputs. The combined join can generate a sorted output even from unsorted inputs, at the same cost as a hybrid hash join, and thus is highly useful for processing unsorted inputs, even large unsorted inputs.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer-executed method for query processing in a relational database comprising:
   receiving inputs of a variety of cases and sizes, the variety of cases comprising combinations of unsorted, sorted, and indexed inputs, and the variety of sizes comprising input sizes from smaller than available memory to input sizes substantially larger than the available memory;
   performing a combined join of inputs using an index in memory formed from records of a first input and probed with records from a second input;

optimizing the index for increased-speed searching by fast parent-to-child navigation, wherein the optimizing comprises:
  pinning pages in a buffer pool; and
  adding off-page child pointers to parent pages using memory addresses of buffer descriptors of child pages; and
performing a combined join for unsorted large inputs by:
  consuming the first input and the second input that is at least as large as the first input; and
  writing sorted run files to temporary storage for both the first and second inputs.

2. The method according to claim 1 wherein
performing the combined join for unsorted large inputs further comprising:
  merging run files of the first input into a single run;
  merging run files of the second input into run files of approximately equal size to the first input;
  selecting a key range wherein memory can hold all records from the first input with key values in the selected key range;
  building an in-memory index for records from the first input;
  joining all records with key values in the key range with the indexed records from the first input; and
  repeating actions of selecting the key range, building the in-memory index, and joining all records with key values until all join processing for all key ranges is complete.

3. The method according to claim 2 further comprising:
merging runs from the first input to completion; and
incompletely merging the runs from the second input into runs approximately equal to the size of the first run.

4. The method according to claim 2 further comprising:
dividing a key domain into ranges wherein each range from the first input and an in-memory index for index nested loops join fit into memory.

5. The method according to claim 1 further comprising:
performing an in-memory index nested loops join operation; and
accelerating the in-memory index nested loops join to operate as fast as an in-memory hash join using at least one technique selected from a group of techniques consisting of pre-loading, large pages, key normalization, prefix truncation, dynamic prefix truncation, order-preserving compression, poor man's normalized key, interpolation search, pinning, administration that avoids replacement, in-memory pointers, and resumed descent.

6. The method according to claim 1 further comprising:
performing a sort-based join that operates with speed and resource consumption specifications at least approximately equal to a hybrid hash join for unsorted inputs and adapts operating parameters to exploit characteristics of both sorted and indexed inputs, the operating parameters selected from a group consisting of amount of data sorted, memory partitioning, and technique for addressing unknown input size;
performing a join that produces sorted output from inputs including unsorted inputs at approximately the same memory and computation cost as a hybrid hash join;
performing a combined join to implement any one variant selected from a group consisting of inner join, left/right/full outer join, (anti-) semi-join, and set operations intersection/union/difference/symmetric difference;
performing a combined join in at least one context selected from a group consisting of demand-driven dataflow, data-driven dataflow in a computer selected from a group consisting of uni-processors, many-core processors, shared-memory computers, distributed-memory computers, and massively-parallel computers; and
performing a combined join in at least one level of a memory hierarchy, the levels of memory hierarchy selected from a group consisting of central processing unit (CPU) cache, random access memory (RAM), flash storage, and storage disks.

7. A computer-implemented system comprising:
means, executed by a processor, for performing query processing in a relational database comprising:
  means for receiving inputs of a variety of cases and sizes, the variety of cases comprising combinations of unsorted, sorted, and indexed inputs, and the variety of sizes comprising input sizes from smaller than available memory to input sizes substantially larger than the available memory; and
  means for performing a combined join of inputs using an index in memory formed from records of a first input and probed with records from a second input;
  means for optimizing the index for increased-speed searching by fast parent-to-child navigation comprising:
    pinning pages in a buffer pool;
  means for adding off-page child pointers to parent pages using memory addresses of buffer descriptors of child pages; and
  means for performing a combined join for unsorted large inputs, wherein the first input and the second input that is at least as large as the first input are consumed, and sorted run files are written to temporary storage for both the first and second inputs.

8. The system according to claim 7 further comprising:
an article of manufacture comprising:
  a controller-usable medium having a computer readable program code embodied in a controller for performing the query processing in the relational database, the computer readable program code further comprising:
    code causing the controller to receive the inputs of the variety of cases and sizes; and
    code causing the controller to perform the combined join of two of the received inputs using the index in memory formed from records of the first input and probed with records from the second input;
    code causing the controller to optimize the index for increased-speed searching by fast parent-to-child navigation by pinning pages in the buffer pool and adding off-page child pointers to parent pages using memory addresses of buffer descriptors of the child pages.

9. The system according to claim 7, the means for performing a combined join for unsorted large inputs wherein:
run files of the first input are merged to completion into a single run, and run files of the second records are incompletely merged from the second input into runs the size of the first run in run files that are larger than size of the first run; and
a key range is selected wherein memory can hold all records from the first input with key values in the selected key range and a key domain is divided into ranges wherein each range from the first input and an in-memory index for the index nested loops join fit into memory, an in-memory index is built for records from the first input, all records with key values in the key range are joined with the indexed records from the first input, and operations of selecting the key range, building the in-memory index, and joining all records with key values are repeated until all join processing for all key ranges is complete.

10. A computer-implemented system comprising:

a processor that performs query processing in a relational database by receiving inputs of a variety of cases and sizes, and performing a combined database join of two of the received inputs using an index in memory formed from records of a first input and probed with records from a second input by optimizing the index for increased-speed searching by fast parent-to-child navigation, wherein the optimizing comprises pinning pages in a buffer pool, and adding off-page child pointers to parent pages using memory addresses of buffer descriptors of child pages, the variety of cases comprising combinations of unsorted, sorted, and indexed inputs, and the variety of sizes comprising input sizes from smaller than available memory to input sizes substantially larger than available memory, the processor operative to perform a combined join for unsorted large inputs, wherein the first input and the second input that is at least as large as the first input are consumed, and sorted run files are written to temporary storage for both the first and second inputs.

11. The system according to claim 10, the processor operative to perform the combined join for unsorted large inputs:

wherein run files of the first input are merged to completion into a single run, and run files of the second records are incompletely merged from the second input into runs the size of the first run in run files that are larger than size of the first run; and wherein a key range is selected wherein memory can hold all records from the first input with key values in the selected key range and a key domain is divided into ranges wherein each range from the first input and an in-memory index for the index nested loops join fit into memory, an in-memory index is built for records from the first input, all records with key values in the key range are joined with the indexed records from the first input, and operations of selecting the key range, building the in-memory index, and joining all records with key values are repeated until all join processing for all key ranges is complete.

12. The system according to claim 10 further comprising:

the processor operative to perform an in-memory index nested loops join operation and accelerate the in-memory index nested loops join to operate as fast as an in-memory hash join using at least one technique selected from a group of techniques consisting of pre-loading, large pages, key normalization, prefix truncation, dynamic prefix truncation, order-preserving compression, poor man's normalized key, interpolation search, pinning, administration that avoids replacement, in-memory pointers, and resumed descent.

13. The system according to claim 10 further comprising:

the processor operative to perform a combined join that implements any one variant selected from a group consisting of inner join, left/right/full outer join, (anti-)semi-join, and set operations intersection/union/difference/symmetric difference.

14. The system according to claim 10 further comprising:

the processor operative to perform a combined join in at least one context selected from a group consisting of demand-driven dataflow, data-driven dataflow in a computer selected from a group consisting of uni-processors, many-core processors, shared-memory computers, distributed-memory computers, and massively-parallel computers; and the processor operative to perform a combined join in at least one level of a memory hierarchy, the levels of memory hierarchy selected from a group consisting of central processing unit (CPU) cache, random access memory (RAM), flash storage, and storage disks.

* * * * *

UNITED STATES PATENT AND TRADEMARK OFFICE
CERTIFICATE OF CORRECTION

PATENT NO. : 9,122,724 B2  
APPLICATION NO. : 12/260053  
DATED : September 1, 2015  
INVENTOR(S) : Goetz Graefe Page 1 of 1

It is certified that error appears in the above-identified patent and that said Letters Patent is hereby corrected as shown below:

Claims

In column 9, line 13, in Claim 2, delete "claim 1" and insert -- claim 1, --, therefor.

Signed and Sealed this
Eighth Day of March, 2016

Michelle K. Lee
*Director of the United States Patent and Trademark Office*